Nov. 3, 1931.  R. M. MATSON  1,830,613
CONTROL SYSTEM
Filed Oct. 23, 1928
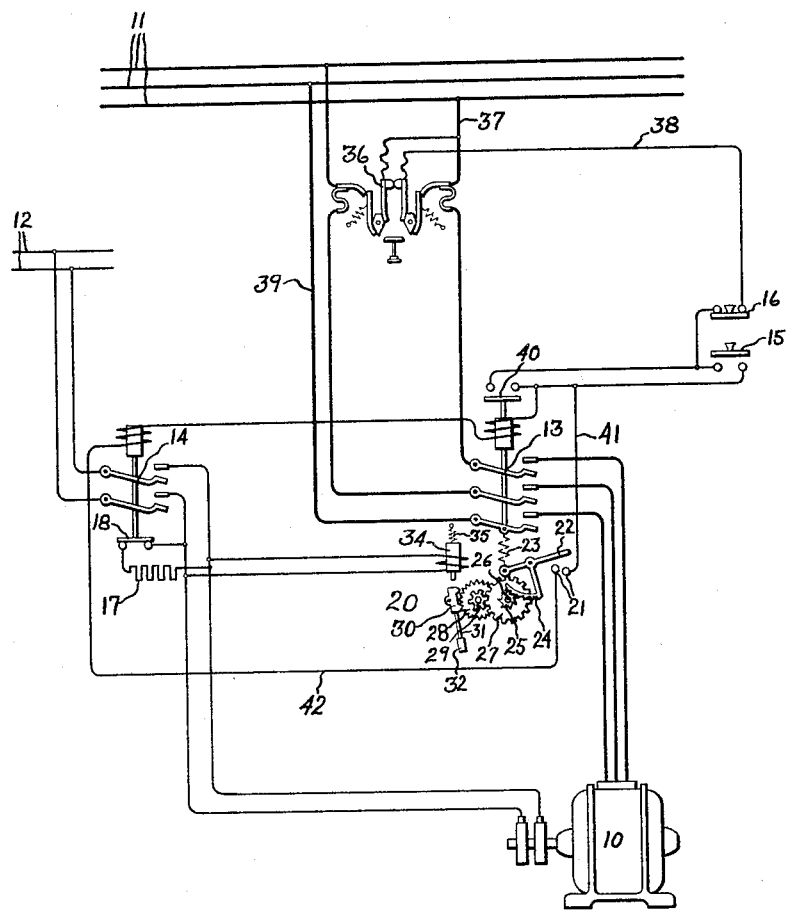
Inventor:
Richard M. Matson
by Charles E. Tullar
His Attorney Patented Nov. 3, 1931

1,830,613

UNITED STATES PATENT OFFICE

RICHARD M. MATSON, OF SCHENECTADY, NEW YORK, ASSIGNOR TO GENERAL ELECTRIC COMPANY, A CORPORATION OF NEW YORK

CONTROL SYSTEM

Application filed October 23, 1928. Serial No. 314,484.

My invention relates to the control of electric motors, more particularly to the control of alternating current synchronous motors, and has for its object the provision of a simple and efficient system of control for a synchronous motor whereby the motor field will be applied during the starting period only after the motor has attained substantially synchronous operating conditions.

It has long been general practice to start a synchronous motor substantially as an induction machine, the field windings of the motor being connected in a local discharge circuit during the starting period. When the motor has reached substantially synchronous speed the field windings are energized whereupon the motor will tend to pull itself into synchronism.

It will be understood that it is very necessary to apply the motor excitation at the proper time or else serious detrimental results will follow. For instance, should the excitation be applied when the motor is first started, a counter torque will develop due to the excitation and in some instances this torque may prevent acceleration. If the field excitation be applied before the motor has attained approximately 90 per cent of synchronous speed, the motor will not pull into synchronism and will probably slow down and run at a reduced speed, taking a heavy fluctuating current.

In one of its aspects, my invention contemplates the provision of a control system for a synchronous motor whereby the field excitation will be applied only after the motor has attained substantially synchronous speed.

In carrying my invention into effect in one form thereof I provide means for controlling the excitation of the synchronous motor operative to apply the field in response to a suitable motor operating condition, which condition will be a measure of the motor speed. In order to insure that the motor will be in a condition suitable for the application of the field, I further cause my control means to respond to a predetermined time interval so that the motor field will be applied a suitable interval of time after the motor has attained its substantially synchronous operating speed.

For a more complete understanding of my invention reference should be had to the accompanying drawing, the single figure of which is a diagrammatic representation of a system of control embodying my invention.

Referring to the drawing I have shown my invention in one form in connection with an alternating current synchronous motor. It will be understood that the synchronous motor 10 is provided with a three phase armature winding on its stator member together with field windings mounted on its rotor member. It is believed unnecessary for a proper understanding of this invention to illustrate in detail the disposition of these windings since any preferred well-known arrangement may be employed. As shown, a suitable three phase source of alternating current supply 11 is provided for the armature winding of the motor, and a suitable direct current source of supply 12 is provided for exciting the field windings of the motor. In order to control the power connections for the synchronous motor, a suitable switch 13 shown as an electro-responsive switch is interposed in the connections leading to the synchronous motor from the alternating current supply source 11. Likewise, in order to control the excitation of the motor field windings, a suitable control switch 14 shown as an electro-responsive switch is inserted in the connections leading to the field windings from the direct current supply source 12. The operating coil of the power switch 13 is controlled by a suitable master switch, shown as a push button 15, remotely located with respect to the motor. It will be understood that a suitable "stop" button 16 will be associated with the remote control of the motor so that the operating motor may be deenergized when desired.

As shown, a suitable discharge resistor 17 is provided to be connected in a local circuit with the field windings during the starting period. The field contactor 14 is provided with an interlock 18 so arranged that when the contactor 14 is open the field winding local circuit will be completed and when the contactor is closed so as to effect the energization of the field windings, the field winding local circuit will be interrupted.

It will be understood that in the starting operation the synchronous motor 10 will be operated as an induction motor. It will be further understood that during the starting period the field windings will be connected in a local circuit with the discharge resistor 17. After the motor has been brought up substantially to its synchronous speed the field windings will be energized so as to cause the motor to pull itself into synchronism.

In order to control the excitation of the motor field windings so that they will be energized a predetermined interval of time after the motor has attained substantially synchronous speed, I provide suitable time element switching mechanism 20 arranged to control the energization of the operating coil of the field contactor 14. I initiate the operation of this timing mechanism in response to the voltage induced in the local field winding circuit so as to effect an energization of the field contactor to close a predetermined interval of time after the induced voltage has attained a value corresponding to substantially synchronous motor operating conditions.

The timing switch 20 comprises a pair of suitable contacts 21 which are inserted in the circuit to be controlled or in a controlling circuit for the circuit to be controlled. In my control system these contacts will be inserted in the energizing circuit for the field contactor 14. These contacts are placed under the control of a suitable pivotally mounted bridging contact arm 22 which in turn is placed under the control of suitable gear escapement timing mechanism. The contact arm 22 is arranged to be biased to bridge the contacts 21 by any suitable means in response to the closing of the main line contactor 13. As shown, a suitable tension spring 23 is provided for this purpose, the spring serving to interconnect the movable contact of the switch 13 and the free end of the contact arm 22. It will be obvious that any other suitable means, as for instance, an electromagnet energized responsively to the closing of the line contactor, likewise may be provided to bias the contact 22 to bridge its associated contacts.

The contact member 22 is connected to the timing mechanism by means of the curved or arcuate rack 24 provided on the contact member. As shown, this arcuate rack cooperates with the ratchet pinion 25 fixedly mounted upon the operating shaft 26 so as to form a one way driving connection between the contact member and the operating shaft. It will be understood that the arcuate rack 24 and the pinion 25 will be provided with suitably shaped teeth so that the one way interlocking connection will be established between them.

The timing mechanism further comprises a gear 27 fixedly mounted upon the operating shaft 26. The escapement gear 28 is mechanically interconnected with the gear 27 by means of the pinion 29 so that when the escapement gear 28 is permitted to rotate, the contact arm 22 will be moved in a clockwise direction under the influence of its biasing spring 23.

The escapement gear 28 is suitably controlled to produce a time delay action by means of a double acting pendulum pawl 30, which is pivotally mounted adjacent the escapement gear so as to cooperate with the teeth formed on the periphery thereof. The pawl 30 is formed with a pendulum like extension 31 which is provided with adjusting nuts 32 mounted thereon so that the pendulum timing action may be readily varied. It will be understood that the engaging surfaces of the pawl 30 and the teeth of the escapement gear 28 will be so shaped that the timing mechanism will be always self-starting whenever a rotating force is applied to the escapement gear. Thus when a strain is set up in the spring 23 the contact arm 22 will be moved to its bridging position in an interval of time dependent upon the setting of the timing mechanism, it being understood that the retarding action of the timing mechanism may be readily varied by adjusting the position of the nuts 32. It will be further understood that the setting of the timing mechanism may be varied by adjusting the spring 23.

The timing mechanism thus far described is essentially similar to that described in the copending U. S. application of Robert W. Goff, Serial No. 161,919, filed January 18, 1927 and assigned to the same assignee as this invention.

It will be observed that when the switch 13 has been closed so as to effect an energization of the motor 10, the spring 23 will be placed under tension so as to bias the contact 22 to close an energizing circuit for the field contactor 14. But, as mentioned above, I delay the action of the timing mechanism responsively to the voltage induced in the closed field circuit during the starting period. To this end I provide a suitable electromagnet 34 which when energized will move its armature to a position to engage the pawl 30 so as to prevent operation thereof. The electro-magnet is normally biased out of engagement with the pawl 30 by any suitable means, as for instance a tension spring 35. As shown, the operating coil of the electro-magnet 34 is connected across the field discharge resistor 17 and thus is subjected to the voltage drop across this resistor when there is a flow of current through the local field circuit.

It will be readily understood by those skilled in the art that the current induced in the closed field circuit will be of a substantially constant value until the motor has approached substantially synchronous operating conditions when it will fall rapidly to zero by reason of the fact that the reactance of the field circuit is relatively high while the resistance is relatively low and because of the fact that the induced field voltage is substantially proportional to the motor speed and drops in a straight line relation as the motor speed increases. Thus, during the starting period the armature of the electromagnet 34 will be securely held by a substantially constant force in a position to prevent operation of the timing mechanism while after the motor has attained substantially synchronous operating conditions the armature will be retracted by its biasing spring 35 so as to permit the timing mechanism to function.

The overload protective relay 36 is provided for the usual purpose, that is, protecting the motor against excessively heavy currents. Preferably this relay should be of the inverse time element type which depends upon a certain current for opening it. One of these relays which may be conveniently employed for this purpose is described and claimed in U. S. Patent No. 1,527,645 granted to C. I. Hall and dated February 24, 1925. It will be understood that when the current taken by the motor is abnormally high, the relay will effect an opening of the energizing circuit for the line contactor 13, which thereupon will immediately open the motor power circuit.

In operation, the motor 10 will be electrically interconnected with its supply source by depressing the "Start" button 15. When the button 15 has been depressed the line contactor 13 will be energized to close by a circuit which may be traced from the lower conductor of the supply source 11 through the line conductor 37, the contacts of the thermal overload relay 36, the conductor 38, the stop push button 16, the start push button 15, the operating coil of the contactor 13 and thence through the line conductor 39 to the middle conductor of the supply source. It will be observed that the switch 13 is provided with an interlock 40 which when the switch is in its closed position will establish a holding circuit for the line contactor 13 through the stop push button 16. Thus, it is but necessary to momentarily depress the start button 15 to effect an energization of the motor. As a result of this operation the motor will begin to speed up and tend to approach its synchronous speed. During the starting period the voltage induced in the local field circuit will cause a flow of current through the discharge resistor 17. As a result there will be a voltage drop across the operating coil of the electromagnet 34 and as has been explained, the electromagnet will be held in its locking position with a substantially constant force.

After the motor has attained its substantially synchronous speed, the current flowing through the resistor 17 will rapidly decrease in value and as a result the electromagnet 34 will be moved to its releasing position under the influence of its biasing spring 35. The contact 22 will thereupon begin to move to its bridging position under the influence of the spring 23 which will have been tensioned by the closing of the line contactor 13. After an interval of time, the length of which will be determined by the retarding action of the timing mechanism, the contact 22 will bridge the contacts 21 and close an energizing circuit for the field contactor 14 from the lower conductor to the supply source 11 through the line conductor 37, the contacts of the overload relay 36, the conductor 38, the stop push button 16, the interlock 40, the conductor 41, the bridged contacts 21, the conductor 42, the operating coil of the contactor 14, and thence through the line conductor 39 to the middle conductor of the supply source 11. The field discharge circuit will be interrupted in consequence and the field windings will be connected directly to their exciting source 12. The motor 10 will then pull itself into synchronism and will operate as a synchronous motor.

It will be observed that the operation of the timing mechanism 20 will not be initiated until the voltage induced in the closed field winding circuit has been reduced substantially to zero value. Thus, since this induced voltage is a measure of the motor operating speed it will be impossible for the timing mechanism to operate until the motor has attained its substantially synchronous operating speed. Moreover, the timing mechanism may be adjusted to permit the contact 22 to bridge its contacts any suitable time interval after the motor has reached its substantially synchronous operating conditions. Thus, the motor will always be in its most favorable condition before the field excitation will be applied.

While I have described my invention as embodied in concrete form and operating in a specific manner in accordance with the provisions of the Patent Statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. The combination with an alternating current synchronous motor having field windings, of electro-responsive switching mechanism arranged to control the excitation of said field windings, time element switching mechanism for controlling said electro-responsive switching mechanism so that said field windings are energized a predetermined interval of time after the operation of said timing mechanism has been initiated and means for locking said timing mechanism responsively to the motor speed so that the operation of said timing mechanism is initiated only after said motor has attained its substantially synchronous speed.

2. A system of control comprising an alternating current synchronous motor having field windings, a source of excitation for said field windings, means arranged to include said field windings in a local circuit, an electro-responsive switch arranged to effect an excitation of said field windings upon being energized, time element switching mechanism for controlling the energization of said electro-responsive switch so that said switch is energized to effect the excitation of said field windings a predetermined interval of time after the operation of said timing mechanism has been initiated and means for controlling the operation of said time element switching mechanism comprising means dependent upon an electrical condition in said local circuit for initiating the operation of said time element switching mechanism upon said motor attaining substantially synchronous operating conditions.

3. A system of control comprising an alternating current synchronous motor having field windings, a source of excitation for said field windings, a discharge resistor for said field windings, means arranged to include said field windings in a local circuit with said discharge resistor, an electro-responsive switch arranged to effect an excitation of said field windings upon being energized, time element switching mechanism for controlling the energization of said electro-responsive switch connected so that said electro-responsive switch is energized a predetermined interval of time after the operation of said time element switching mechanism has been effected, and an electromagnet connected in parallel with said discharge resistor operably associated with said timing mechanism so as to prevent the operation thereof until said motor has attained substantially synchronous operating conditions.

4. The combination of an alternating current synchronous motor having field windings, of electro-responsive switching mechanism arranged to control the excitation of said field windings, a control circuit for said electro-responsive switching mechanism whereby upon being energized said switching mechanism operates to effect an excitation of said field windings, a switch for effecting an energization of said control circuit upon being moved to its closed position, timing mechanism for controlling said switch so that said switch is closed a predetermined interval of time after the operation of said timing mechanism has been initiated, and means for controlling the operation of said timing mechanism comprising an electromagnet energized responsively to the voltage induced in said local circuit and operably associated with said timing mechanism so that the operation of said mechanism is prevented while said induced voltage is above a predetermined value and upon said voltage attaining said predetermined value the operation of said timing mechanism is initiated.

5. In combination with an alternating current synchronous motor having field windings, of an alternating current source of electrical supply for said motor, means arranged to connect said motor to said source of supply, means arranged to include the said field windings in a local circuit, a source of direct current excitation for said field windings, an electro-responsive switch arranged to control the excitation of said field windings, a control circuit for said second switch whereby said switch operates to connect said field windings to said excitation source when said control circuit is energized and means for controlling said circuit comprising a switch included in said circuit and biased to its closed position in response to the interconnection of said motor with said alternating current source of supply, timing mechanism for controlling the closing of said switch so that said switch is closed a predetermined interval of time after the operation of said timing mechanism has been initiated and an electromagnet energized responsively to the voltage induced in said local circuit for locking said timing mechanism whereby operation thereof is prevented when said voltage is above a predetermined value.

In witness whereof, I have hereunto set my hand this 22nd day of October, 1928.

RICHARD M. MATSON.